(12) United States Patent
Wang et al.

(10) Patent No.: US 10,935,968 B2
(45) Date of Patent: *Mar. 2, 2021

(54) ROBOT, ROBOT SYSTEM, AND METHOD FOR SETTING COORDINATE SYSTEM OF ROBOT

(71) Applicant: FANUC CORPORATION, Yamanashi (JP)

(72) Inventors: Yuelai Wang, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 240 days.

This patent is subject to a terminal disclaimer.

(21) Appl. No.: 16/168,172

(22) Filed: Oct. 23, 2018

(65) Prior Publication Data

US 2019/0129400 A1    May 2, 2019

(30) Foreign Application Priority Data

Oct. 27, 2017   (JP) .............................. JP2017-207772

(51) Int. Cl.
*G05B 19/04* (2006.01)
*G05B 19/18* (2006.01)
(Continued)

(52) U.S. Cl.
CPC .......... *G05B 19/425* (2013.01); *B25J 9/1692* (2013.01); *G05B 19/4086* (2013.01); *G05B 2219/39399* (2013.01); *G05B 2219/39401* (2013.01)

(58) Field of Classification Search
CPC .. B25J 9/1692; G05B 19/4086; G05B 19/425; G05B 2219/39399; G05B 2219/39401; G05B 2219/39024
See application file for complete search history.

(56) References Cited

U.S. PATENT DOCUMENTS

| | | | | |
|---|---|---|---|---|
| 4,714,339 A | * | 12/1987 | Lau | B25J 13/089 356/139.08 |
| 4,788,440 A | * | 11/1988 | Pryor | A01B 69/008 250/559.33 |

(Continued)

FOREIGN PATENT DOCUMENTS

| | | |
|---|---|---|
| CN | 104044131 A | 9/2014 |
| DE | 102016116811 A1 | 3/2017 |

(Continued)

OTHER PUBLICATIONS

Chinese Office Action dated Feb. 3, 2020, for Chinese Patent Application No. 201811221649.0.
(Continued)

*Primary Examiner* — Harry Y Oh
(74) *Attorney, Agent, or Firm* — Karceski IP Law, PLLC

(57) ABSTRACT

A robot includes a robot control unit configured to control an operation of a robot, wherein the robot control unit is configured to set a coordinate system of the robot installed on a reference flat surface using measurement results of at least position coordinates in a vertical direction of three or more measurement points on the reference flat surface on which the robot is installed and measurement results of position coordinates of a plurality of reference reflection portions provided on a base portion of the robot.

5 Claims, 5 Drawing Sheets

(51) Int. Cl.
*G05B 19/425* (2006.01)
*B25J 9/16* (2006.01)
*G05B 19/408* (2006.01)

(56) References Cited

U.S. PATENT DOCUMENTS

| | | | |
|---|---|---|---|
| 4,969,108 A | 11/1990 | Webb et al. | |
| 2002/0038855 A1* | 4/2002 | Hwang | B25J 9/1692 |
| | | | 250/559.29 |
| 2012/0078418 A1* | 3/2012 | Borrn | B25J 9/1692 |
| | | | 700/254 |
| 2014/0277722 A1 | 9/2014 | Nagai et al. | |
| 2014/0376768 A1 | 12/2014 | Troy et al. | |
| 2016/0239013 A1 | 8/2016 | Troy et al. | |
| 2017/0010094 A1* | 1/2017 | Iseli | G01B 5/008 |
| 2017/0016712 A1* | 1/2017 | Suzuki | B25J 9/1692 |
| 2017/0072562 A1 | 3/2017 | Kokubo | |
| 2017/0106535 A1 | 4/2017 | Yamaoka et al. | |

FOREIGN PATENT DOCUMENTS

| | | |
|---|---|---|
| DE | 102016012065 A1 | 4/2017 |
| DE | 102017209178 A1 | 12/2018 |
| DE | 102017212261 A1 | 1/2019 |
| EP | 0336174 A2 | 10/1989 |
| EP | 2783806 A2 | 10/2014 |
| JP | S62262106 A | 11/1987 |
| JP | H02-012504 A | 1/1990 |
| JP | H0218602 A | 1/1990 |
| JP | H0569132 A | 3/1993 |
| JP | H10-221066 A | 8/1998 |
| JP | H10207524 A | 8/1998 |
| JP | 2001-074428 A | 3/2001 |
| JP | 2007-256091 A | 10/2007 |
| JP | 2009142904 A | 7/2009 |
| JP | 2011067889 A | 4/2011 |
| JP | 2012035329 A | 2/2012 |
| JP | 2015062991 A | 4/2015 |
| JP | 2017-037053 A | 2/2017 |

OTHER PUBLICATIONS

German Office Action dated Apr. 22, 2020, for German Patent Application No. 102018125841.0.
Decision to Grant a Patent dated Sep. 10, 2019, for Japanese Patent Application No. 2017-207772.
Japanese Search Report dated Sep. 10, 2019, for Japanese Patent Application No. 2017-207772.

* cited by examiner

ROBOT, ROBOT SYSTEM, AND METHOD FOR SETTING COORDINATE SYSTEM OF ROBOT

CROSS-REFERENCE TO RELATED APPLICATIONS

This application is based on and claims priority to Japanese Patent Application No. 2017-207772, filed on Oct. 27, 2017, the entire content of which is incorporated herein by reference.

FIELD OF THE INVENTION

The present invention relates to a robot, a robot system, and a method for setting a coordinate system of a robot.

BACKGROUND OF THE INVENTION

The coordinate system of a robot is set in a robot or a control apparatus for the robot at the time of manufacturing or shipping the robot, and the robot is controlled by the control apparatus using the coordinate system as a reference. When a camera is attached to the robot, and the robot is operated based on an image captured by the camera, the coordinate system of the image captured by the visual sensor is converted into the coordinate system of the robot, thus achieving a task performed by the robot with respect to a workpiece or the like in the image (see Japanese Unexamined Patent Application, Publication No. H2-12504, for example).

SUMMARY OF THE INVENTION

According to a first aspect of the present invention, there is provided a robot installed on a reference flat surface, the robot including a robot control unit configured to control an operation of the robot, wherein the robot control unit is configured to set a coordinate system of the robot, installed on the reference flat surface, using measurement results of at least position coordinates in a vertical direction of three or more measurement points on the reference flat surface and measurement results of position coordinates of a plurality of reference reflection portions provided on a base portion of the robot.

According to a second aspect of the present invention, there is provided a robot system including: a robot installed on a reference flat surface; and a robot control unit configured to control an operation of the robot, wherein the robot control unit is configured to set a coordinate system of the robot, installed on the reference flat surface, using measurement results of at least position coordinates in a vertical direction of three or more measurement points on the reference flat surface and measurement results of position coordinates of a plurality of reference reflection portions provided on a base portion of the robot, and the robot system further comprises an operation program re-setting means configured to perform re-setting of a parameter of an operation program based on displacement of the set coordinate system, the displacement is displacement of the set coordinate system with respect to an initial coordinate system set in advance in the robot or the robot control unit, or displacement of a z axis of the set coordinate system with respect to a vertical axis, the operation program is for operating the robot.

According to a third aspect of the present invention, there is provided a method for setting a coordinate system of a robot, the method including: a step of installing a robot on a reference flat surface; a flat-surface-position measuring step of measuring at least position coordinates in a vertical direction of three or more measurement points on the reference flat surface; a reflection-portion-position measuring step of measuring position coordinates of a plurality of reference reflection portions provided on a base portion of the robot; and a coordinate system setting step of setting a coordinate system of the robot, installed on the reference flat surface, using the position coordinates of the measurement points on the reference flat surface and the position coordinates of the reference reflection portions.

DESCRIPTION OF EMBODIMENT(S) OF THE INVENTION

A robot system according to an embodiment of the present invention is described hereinafter with reference to drawings.

Figure 1:
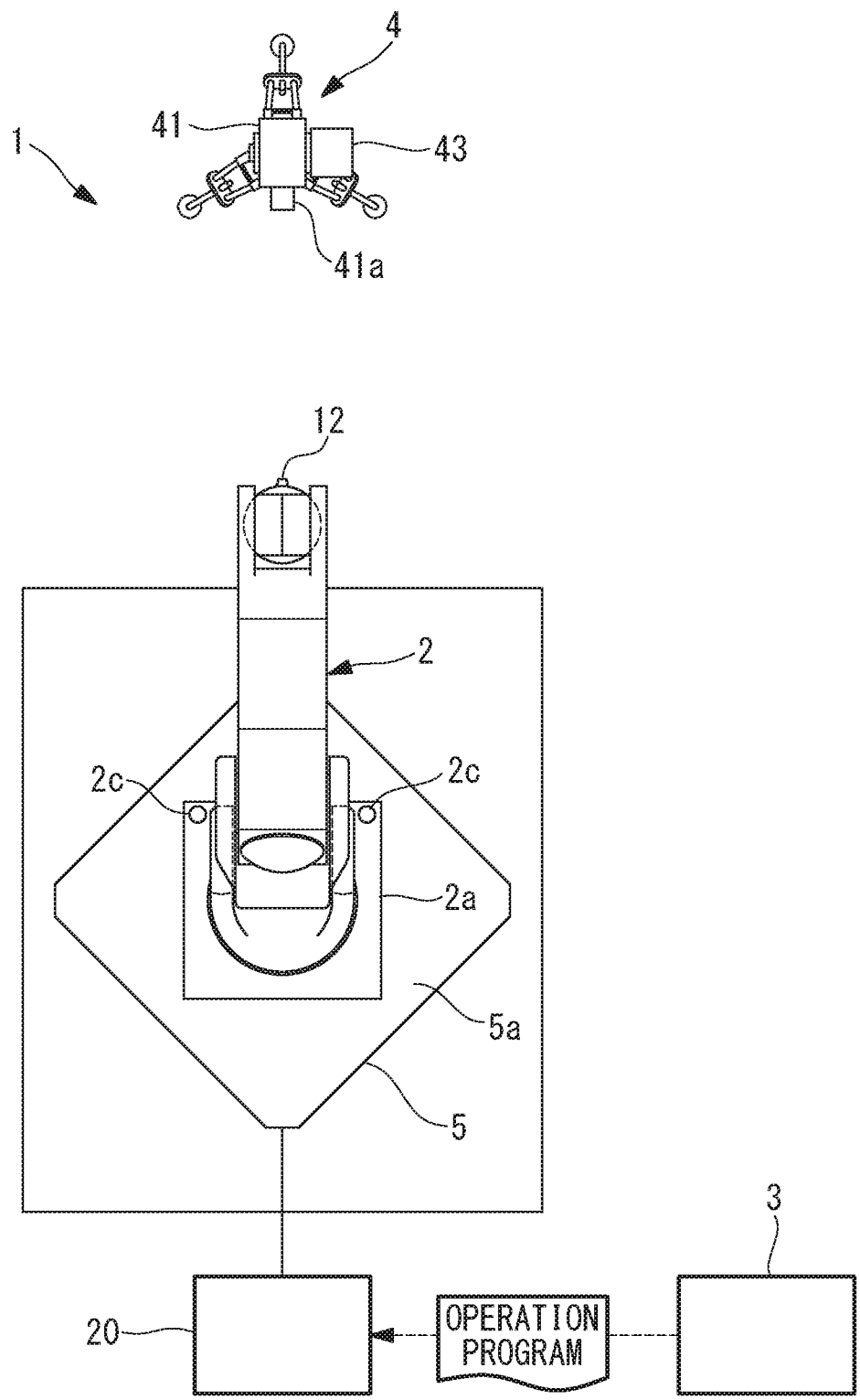
FIG. 1 is a schematic plan view of a robot system according to an embodiment of the present invention.
Figure 3:
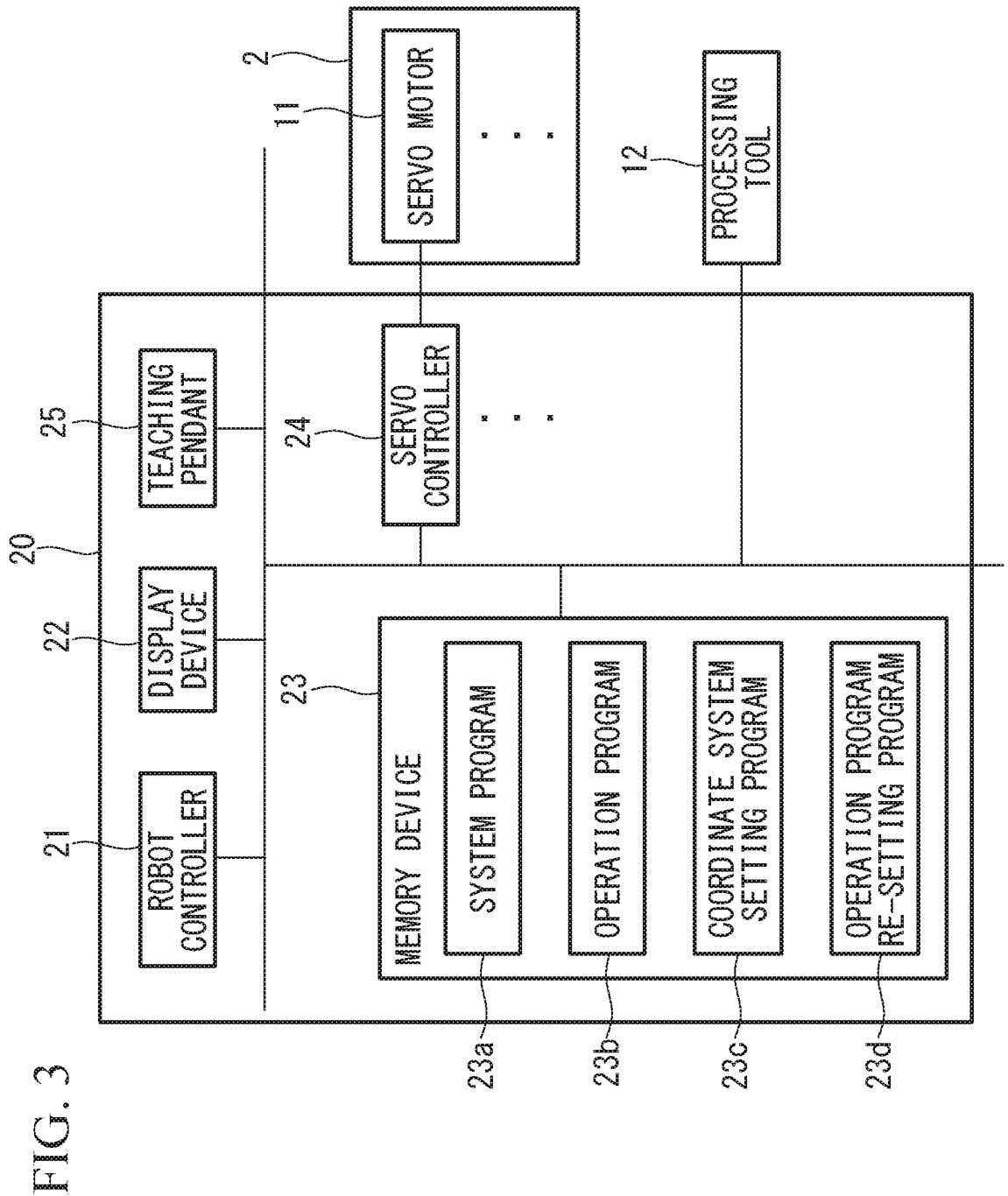
FIG. 3 is a block diagram of a robot control unit of this embodiment.

As shown in FIG. 1 and FIG. 3, this robot system includes a robot 2, a simulation device 3, and a position measuring apparatus 4. The simulation device 3 functions as an off-line program making device for generating an operation program 23b for making the robot 2 perform a predetermined operation. The position measuring apparatus 4 uses a laser beam.

As shown in FIG. 1, the robot 2 performs a predetermined task, such as spot welding to a workpiece (not shown in the drawings), for example. The robot 2 includes a plurality of arm members and joints, and also includes a plurality of servo motors 11 for respectively driving the plurality of joints (see FIG. 3). Each servo motor 11 may be formed of a variety of servo motor such as a rotation motor or a linear motor. Each servo motor 11 has an operation position detection device, such as an encoder, which detects an operation position of the servo motor 11, and detected values of the operation position detection devices are transmitted to a robot control unit 20.

A processing tool 12 is mounted at a distal end portion of the robot 2, and the processing tool 12 performs spot welding on the workpiece W. When the robot 2 is provided for conveying a workpiece, a chuck a suction device or the like, each of which forms a holding device for holding the workpiece, is mounted at the distal end portion of the robot 2 in place of the processing tool 12.

Figure 2:
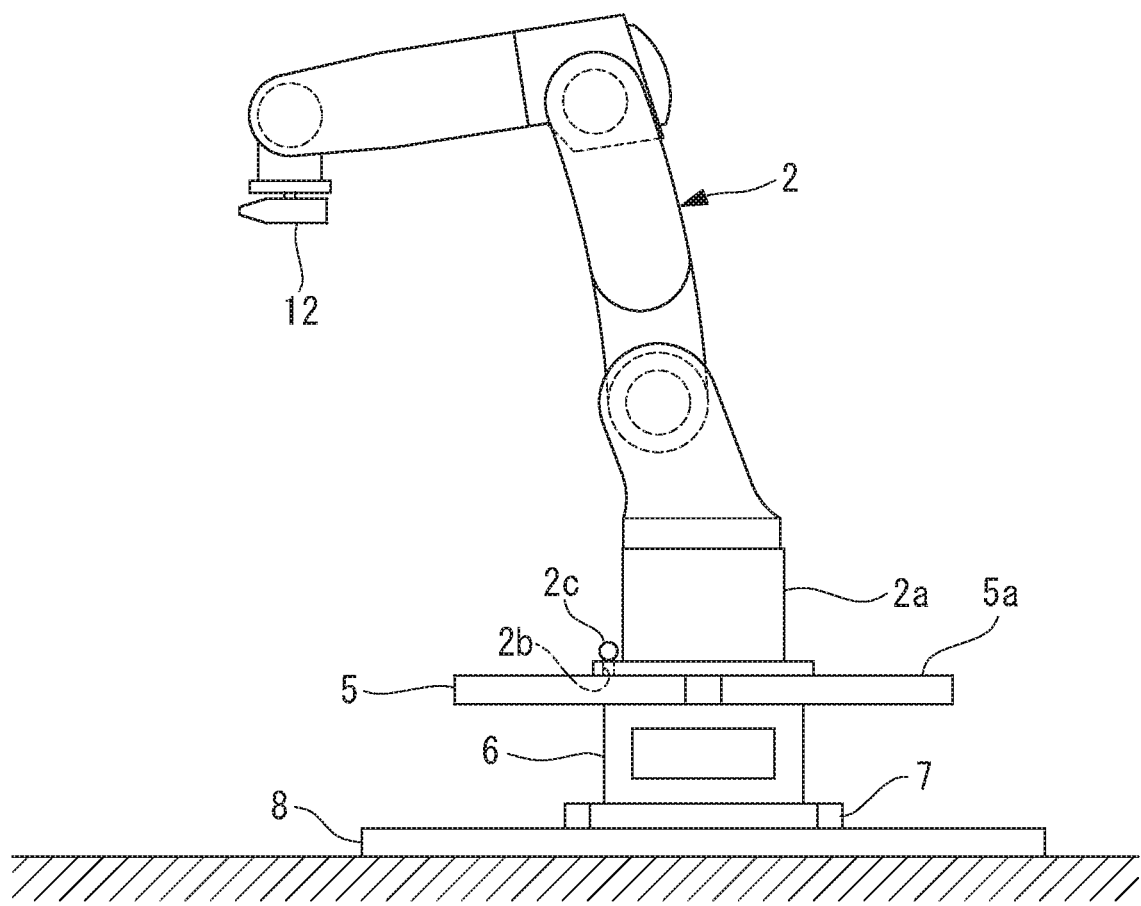
FIG. 2 is a schematic front view of a robot of the robot system of this embodiment.

As shown in FIG. 1 and FIG. 2, the robot 2 is installed on a guaranteed flat surface, that is, on a reference flat surface 5a having a known flatness of a predetermined reference value or less. A plurality of positions on an upper surface of the reference flat surface 5a are measured, and positions of reflection members (reference reflection portions or reflectors) 2c, which are respectively mounted in two reference holes 2b precisely formed on a base portion (base) 2a of the robot 2, are measured, thus setting a coordinate system (also referred to as "world coordinate system") of the robot 2.

In this embodiment, the reference flat surface 5a is an upper surface of a flat plate 5 made of metal, and the flat plate 5 is supported on a base plate 7 and a floor plate 8 through a frame 6. In this embodiment, when a flatness of the reference flat surface 5a is measured at several tens or more of positions, the flatness of the reference flat surface 5a is preferably 1/10 mm or less, and is more preferably 1/100 mm or less. However, the flatness of the reference flat surface 5a is not limited to such values. Further, provided that a floor surface has a known flatness of a predetermined reference value or less, the floor surface may be used as the reference flat surface 5a.

As shown in FIG. 3, the robot control unit 20 includes, for example: a robot controller 21 having a CPU, a RAM and the like; a display device 22; a memory device 23 having a nonvolatile storage, a ROM and the like; a plurality of servo controllers 24 provided so as to respectively correspond to the servo motors 11 of the robot 2; and a teaching pendant 25 which is connected to the robot control unit 20, and can be carried by an operator. The teaching pendant 25 may be configured to perform wireless communication with the robot control unit 20.

The memory device 23 stores a system program 23a. The system program 23a is responsible for the basic function of the robot control unit 20. The memory device 23 also stores at least one operation program 23b which is made by the simulation device 3. To be more specific, a model of the robot 2 and a model of the workpiece are made in the simulation device 3. For example, the operation program 23b for the robot 2 is made in the simulation device 3 such that the robot 2 performs welding at a plurality of welding points on the inside and outside of the workpiece while avoiding contact with the workpiece, and the operation program 23b is stored in the memory device 23. The memory device 23 also stores a coordinate system setting program 23c and an operation program re-setting program (operation program re-setting means) 23d.

The robot controller 21 operates by the system program 23a. In performing welding on the workpiece, the operation program 23b stored in the memory device 23 is read out, and is temporarily stored in the RAM. Control signals are transmitted to the respective servo controllers 24 according to the operation program 23b which is read out. With such operations, servo amplifiers of the respective servo motors 11 of the robot 2 are controlled, and also emission of a laser beam from the processing tool 12 is controlled so as to perform welding on the workpiece.

Figure 5:
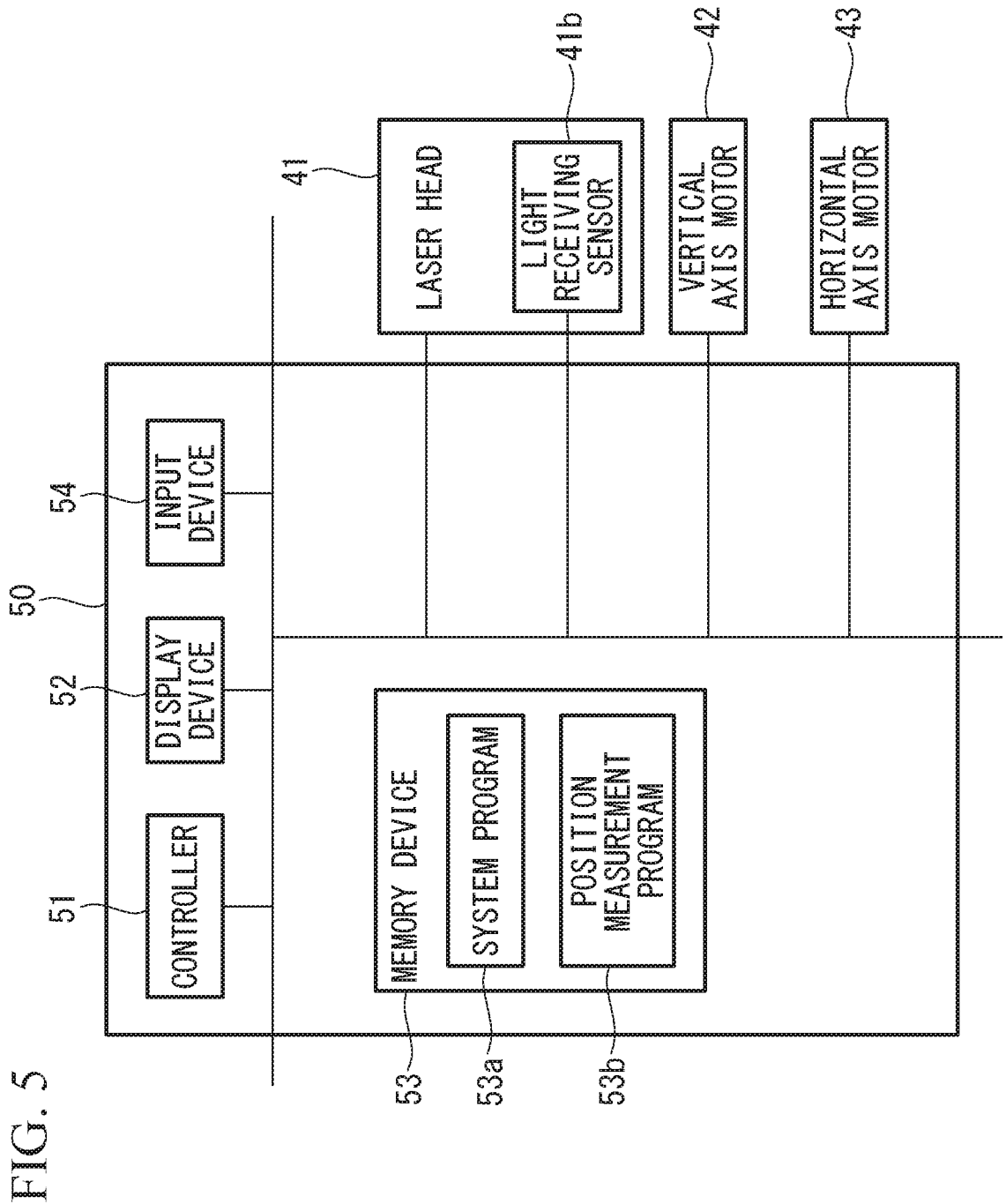
FIG. 5 is a block diagram of a measurement control apparatus of this embodiment.

The position measuring apparatus 4 includes a measurement control apparatus 50 shown in FIG. 5. In this embodiment, the measurement control apparatus 50 is incorporated in the position measuring apparatus 4. However, the measurement control apparatus 50 may be disposed at another position external to the position measuring apparatus 4.

Figure 4:
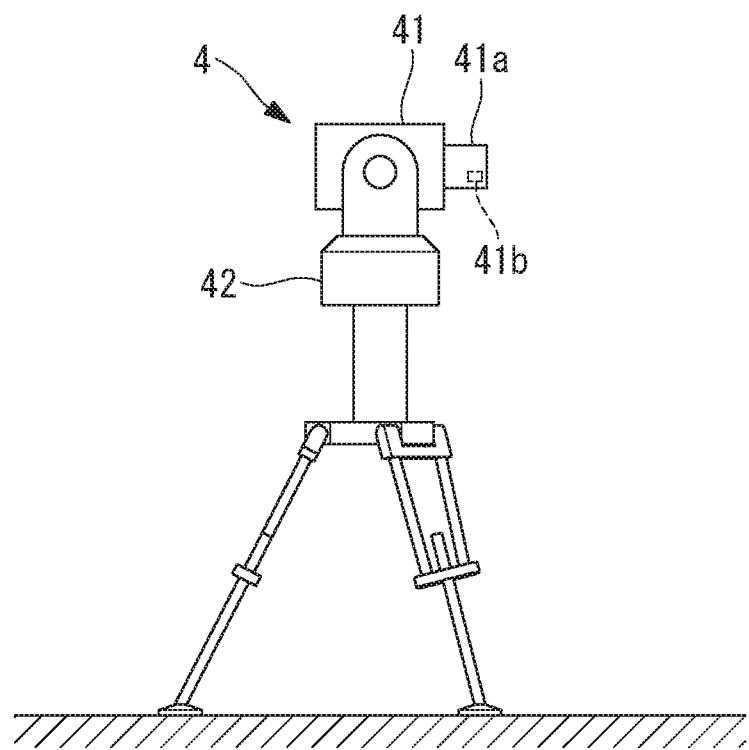
FIG. 4 is a side view of a position measuring apparatus of this embodiment.

As shown in FIG. 4, the position measuring apparatus 4 includes a laser head 41, a vertical axis motor 42, and a horizontal axis motor 43 (see FIG. 5). The laser head 41 emits a laser beam toward the reference flat surface 5a and the reflection members 2c, and receives the reflected light from the reference flat surface 5a and the reflection members 2c. The vertical axis motor 42 and the horizontal axis motor 43 form a head driving device which changes a direction of the laser head 41.

The vertical axis motor 42 is provided to rotate the laser head 41 and the horizontal axis motor 43 about a vertical axis, and the horizontal axis motor 43 is provided to rotate the laser head 41 about a horizontal axis. The vertical axis motor 42 and the horizontal axis motor 43 are connected to the measurement control apparatus 50, and the vertical axis motor 42 and the horizontal axis motor 43 are controlled by the measurement control apparatus 50. Further, each motor 42, 43 has an operation position detection device, such as an encoder, which detects an operation position of the motor 42, 43, and detected values of the operation position detection devices are transmitted to the measurement control apparatus 50.

A laser beam emitting section 41a is provided in the laser head 41, and is configured such that a laser beam from a laser oscillator (not shown in the drawing) is emitted from the laser beam emitting section 41a. Further, a light receiving sensor 41b is disposed in the laser beam emitting section 41a of the laser head 41, and the light receiving sensor 41b receives the reflected light which is reflected from the reflection member 2c and the like. The laser head 41 is connected to the measurement control apparatus 50. The measurement control apparatus 50 controls emission of a laser beam from the laser beam emitting section 41a of the laser head 41. A detection result of the light receiving sensor 41b of the laser head 41 is transmitted to the measurement control apparatus 50.

As shown in FIG. 5, the measurement control apparatus 50 includes, for example: a controller 51 having a CPU, a RAM and the like; a display device 52; a memory device 53 having a nonvolatile storage, a ROM and the like; and an input device 54. The input device 54 may be configured to perform wireless communication with the measurement control apparatus 50.

The memory device 53 stores a system program 53a. The system program 53a is responsible for the basic functions of the measurement control apparatus 50. To set the coordinate system of the robot 2, the memory device 53 also stores a position measurement program (position measurement means) 53b. The position measurement program 53b controls the position measuring apparatus 4 to measure position coordinates of a plurality of respective measurement points on the reference flat surface 5a and position coordinates of the respective reflection members 2c.

In this embodiment, based on at least the vertical position of the position coordinates of the plurality of points on the upper surface of the reference flat surface 5a, a horizontal plane, which contains the x axis and the y axis of the coordinate system of the robot 2, is set. Directions of the x axis and the y axis of the robot coordinate system are set based on position coordinates of the respective reflection members 2c. Further, based on the positions of the respective reflection members 2c and the horizontal plane, the origin of the coordinate system of the robot 2 is set at a position slightly above the horizontal plane, and the x axis, the y axis, and the z axis perpendicular to the horizontal plane are set using the origin as the center.

A coordinate system (initial coordinate system) is set in the robot 2 or the robot control unit 20 of this embodiment before the robot 2 is installed on the reference flat surface 5a, for example, at the time of manufacturing the robot 2. That is, in this embodiment, when the robot 2 is installed on the reference flat surface 5a, re-setting (calibration) of the coordinate system of the robot 2 is performed using the position coordinates of the plurality of points on the upper surface of the reference flat surface 5a and the position coordinates of the reflection members 2c.

The operation of the robot controller 21 and the controller 51 when performing re-setting of the coordinate system of the robot 2 is described below.

First, the position measuring apparatus 4 is positioned at an approximate position for measurement. For example, when the controller 51 receives a predetermined signal (in association with a first step), the controller 51 is operated by the position measurement program 53b. Accordingly, laser beam is emitted from the laser head 41 to the respective reflection members 2c mounted in the two reference holes 2b formed on the base portion 2a of the robot 2, and the light receiving sensor 41b receives the reflected light from the respective reflection members 2c. With such operations, position coordinates of the respective reflection members 2c with respect to the position measuring apparatus 4 (position coordinates in the coordinate system of the position measuring apparatus 4) are measured (in association with a second step).

In this embodiment, adjusting the direction of the laser head 41 by the controller 51 using the vertical axis motor 42 and the horizontal axis motor 43 may allow laser beam to irradiate the respective reflection members 2c from the laser head 41. Alternatively, manually adjusting the direction of the laser head 41 by an operator may allow laser beam to irradiate the respective reflection members 2c from the laser head 41. Each reflection member 2c has extremely small incident range. When laser beam is incident on the incident range, the reflection member 2c performs retroreflection in which the reflection member 2c reflects the laser beam in the incident direction.

Subsequently, the controller 51 directs laser beam to irradiate respective three or more measurement points (four measurement points in this embodiment) on the reference flat surface 5a, and allows the light receiving sensor 41b to receive the reflected light from the respective measurement points. With such operations, position coordinates of the respective measurement points with respect to the position measuring apparatus 4 (the position coordinates in the coordinate system of the position measuring apparatus 4) are measured (in association with a third step). All of the three or more measurement points are not arranged in a straight line.

In this embodiment, adjusting the direction of the laser head 41 by the controller 51 using the vertical axis motor 42 and the horizontal axis motor 43 may allow laser beam to irradiate the respective measurement points from the laser head 41. Alternatively, manually adjusting the direction of the laser head 41 by an operator may allow laser beam to irradiate the respective measurement points from the laser head 41. Further, reflection members may be provided in the respective measurement points on the reference flat surface 5a. In this case, laser beam which is incident on the reflection members is reflected in the incident direction (retroreflection).

Subsequently, based on the measured position coordinates of the respective reflection members 2c and at least the position coordinates in the vertical direction of the respective measurement points, the controller 51 sets the coordinate system of the robot 2 and the position coordinates of the origin of the coordinate system in the coordinate system of the position measuring apparatus 4 (measuring apparatus coordinate system) (in association with a fourth step).

For example, the controller 51 sets the x axis of the coordinate system of the robot 2 and the y axis, orthogonal to the x axis, on a flat surface which contains the position coordinates of all measurement points, and the controller 51 sets the z axis of the coordinate system of the robot 2 in the direction perpendicular to the flat surface. The x axis is set so as to be parallel to a straight line which passes through the respective reflection members 2c, and a position, which is reached by moving in the y axis direction and in the z axis direction by respective predetermined distances from the position coordinates of the center position of the reflection members 2c, is set as the origin of the coordinate system of the robot 2. In this case, the measurement control apparatus 50 receives the predetermined distances from the robot control unit 20 or the like in advance, and stores the predetermined distances therein.

Subsequently, the controller 51 transmits, to the robot control unit 20, the measured position coordinates of the respective measurement points and the respective reflection members 2c, or the position coordinates of the respective measurement points and the respective reflection members 2c as viewed from the origin of the robot 2 which is set in the above-mentioned fourth step (in association with a fifth step). When the controller 51 transmits the measured position coordinates of the respective measurement points and the respective reflection members 2c to the robot control unit 20 as it is, it is unnecessary to perform the fourth step.

The robot controller 21 is operated based on the coordinate system setting program 23c. Accordingly, setting (re-setting) of the coordinate system of the robot 2 is performed based on the position coordinates of the respective measurement points and the respective reflection members 2c which are sent from the measurement control apparatus 50, or based on the position coordinates of the respective measurement points and the respective reflection members 2c as viewed from the origin of the robot 2 which is set in the above-mentioned step fourth step (in association with a sixth step).

For example, the robot controller 21 sets the x' axis of the coordinate system of the robot 2 and the y' axis, orthogonal to the x' axis, on a flat surface which contains the position coordinates of all measurement points, and the robot controller 21 sets the z' axis of the coordinate system of the robot 2 in the direction perpendicular to the flat surface. The x' axis is set so as to be parallel to a straight line which passes through the respective reflection members 2c.

A predetermined position with respect to the reflection members 2c may be set as the origin of the coordinate system of the robot. For example, a position, which is reached by moving in the y axis direction and the z axis direction by respective predetermined distances from the position coordinates of the center position of the reflection members 2c, may be set as the origin of the coordinate system of the robot 2. In this case, the position of the origin is determined in relation to the reflection members 2c in advance.

Subsequently, the robot controller 21 acquires displacement of the coordinate system, for which the re-setting is performed, with respect to the initial coordinate system, or acquires displacement of the z' axis of the coordinate system, for which the re-setting is performed, with respect to the vertical axis (in association with a seventh step). For example, the robot controller 21 acquires gradients of the x' axis, the y' axis, and the z' axis of the coordinate system, for which the re-setting is performed, with respect to the x axis, the y axis, and the z axis of the initial coordinate system. The robot controller 21 acquires a difference between the coordinates of the origin, for which the re-setting is performed, and the coordinates of the origin of the initial coordinate system, and a gradient and a direction of the z' axis of the coordinate system, for which the re-setting is performed, with respect to the vertical axis.

The robot controller 21 is operated based on the operation program re-setting program 23d. Accordingly, re-setting of parameters of the operation program 23b is performed using the displacement acquired in the seventh step thus generating an operation program 23b'. That is, the operation program 23b is set such that a distal end portion of the robot 2 plots the intended trajectory in the initial coordinate system. In such a situation, re-setting of the parameters is performed such that the distal end portion of the robot 2 plots the intended trajectory in the coordinate system for which the re-setting is performed.

The operation program re-setting program 23d may be stored in the simulation device 3. In this case, the simulation device 3 receives the displacement, and the simulation device 3 performs re-setting of parameters of the operation program 23b using the displacement. Further, when the teaching pendant 25 has a function equivalent to that of the simulation device 3, it may be configured such that the teaching pendant 25 performs re-setting of parameters of the operation program 23b using the displacement.

According to this embodiment, the robot 2 is installed on the reference flat surface 5a, and setting (re-setting) of the coordinate system of the robot 2 installed on the reference flat surface 5a is performed using at least the position coordinates in the vertical direction of the three or more measurement points on the reference flat surface 5a, and the measurement results of the position coordinates of the plurality of reflection members 2c provided on the base portion 2a of the robot 2. Accordingly, compared to a case where the initial coordinate system, which is set in advance in the robot 2 or the robot control unit 20 at the time of manufacturing the robot 2, is used as it is, it is possible to more accurately control the operation of the installed robot 2.

For example, in performing correction of position displacement (calibration) of the distal end of the robot 2 which may occur due to gravity, assembly errors or the like, the coordinate system of the robot 2 forming a reference for the correction is accurately set with respect to the reference flat surface 5a. Accordingly, such a configuration is advantageous for accurately performing the calibration.

Further, in the off-line program making device, such as the simulation device 3, the z axis of the coordinate system of the robot 2 is completely parallel to the vertical axis. However, it is extremely difficult to make the z axis of the initial coordinate system of the actually installed robot 2 completely parallel to the vertical axis. On the other hand, in this embodiment, the coordinate system of the robot 2 installed on the reference flat surface 5a is set with respect to the reference flat surface 5a, thus enabling the adjustment for making the coordinate system approach an ideal state, and enabling setting operation which utilizes the coordinate system. Accordingly, such a configuration is advantageous for preventing interference or the like between a workpiece and the robot in operating the robot 2 by the operation program 23b generated by the off-line program making device.

The coordinate system, which is set, is set in the off-line program making device, such as the simulation device 3, thus allowing the off-line program making device to generate the operation program 23b which closer matches actual conditions.

Further, when operation ranges of two robots 2 overlap each other, coordinate systems of the two robots respectively installed on the reference flat surfaces 5a are accurately set with respect to the respective reference flat surfaces 5a. Accordingly, such a configuration is advantageous for operating the two robots 2 while avoiding interference with each other.

Further, in this embodiment, re-setting of parameters of the operation program 23b for operating the robot 2 is performed based on displacement of the coordinate system, which is set, with respect to the initial coordinate system set in advance in the robot 2 or the robot control unit 20, or based on displacement of the z' axis of the coordinate system, which is set, with respect to the vertical axis. Such a configuration is advantageous for more accurately controlling the operation of the robot 2 by the operation program.

The reference flat surface 5a may not necessarily be a horizontal plane, and may be an inclined flat surface, or may be a flat surface which extends in the vertical direction. In these cases, in addition to the position coordinates in the vertical direction of the plurality of measurement points on the reference flat surface 5a, other position coordinates of the plurality of measurement points are also used. Also in these cases, it is possible to perform setting (re-setting) of the coordinate system of the robot 2 which is installed on the reference flat surface 5a.

In this embodiment, the position coordinates of the plurality of measurement points on the reference flat surface 5a and the respective reflection members 2c are measured using the position measuring apparatus 4 which uses a laser beam. However, the position coordinates of the plurality of measurement points and the respective reflection members 2c may be measured using other measuring equipment. For example, the position coordinates of the plurality of measurement points on the reference flat surface 5a may be measured using any of other measuring apparatuses such as a height gauge with a level. The position coordinates of the respective reflection members 2c may be measured using a three-dimensional measuring machine.

The following aspects of the present invention are derived from the aforementioned disclosure.

According to a first aspect of the present invention, there is provided a robot installed on a reference flat surface, the robot including a robot control unit configured to control an operation of the robot, wherein the robot control unit is configured to set a coordinate system of the robot, installed on the reference flat surface, using measurement results of at least position coordinates in a vertical direction of three or more measurement points on the reference flat surface and measurement results of position coordinates of a plurality of reference reflection portions provided on a base portion of the robot.

In the first aspect, the robot is installed on the reference flat surface, and setting of the coordinate system of the robot installed on the reference flat surface is performed using the measurement results of at least the position coordinates in the vertical direction of the three or more measurement points on the reference flat surface and the measurement results of the position coordinates of the plurality of reference reflection portions provided on the base portion of the robot. Accordingly, compared to a case where the initial coordinate system, which is set in advance in the robot or the robot control unit at the time of manufacturing the robot, is used as it is, it is possible to more accurately control the operation of the installed robot.

For example, in performing correction of position displacement (calibration) of the distal end of the robot which may occur due to gravity, assembly errors or the like, the coordinate system of the robot forming a reference for the correction is accurately set with respect to the reference flat surface. Accordingly, such a configuration is advantageous for accurately performing the calibration.

Further, in an off-line program making device, such as a simulation device, the z axis of the coordinate system of the robot is completely parallel to the vertical axis. However, it is extremely difficult to make the z axis of the initial coordinate system of the actually installed robot completely parallel to the vertical axis. On the other hand, in this embodiment, the coordinate system of the robot installed on the reference flat surface is set with respect to the reference flat surface, thus enabling the adjustment for making the coordinate system approach an ideal state, and enabling setting operation which utilizes the coordinate system. Accordingly, such a configuration is advantageous for preventing interference or the like between a workpiece and the robot in operating the robot by the operation program generated by the off-line program making device.

The coordinate system, which is set, is set in the off-line program making device, such as the simulation device, thus allowing the off-line program making device to generate an operation program which closer matches actual conditions.

Further, when operation ranges of the plurality of robots overlap each other, coordinate systems of the plurality of robots respectively installed on the reference flat surfaces are accurately set with respect to the respective reference flat surfaces. Accordingly, such a configuration is advantageous for operating the plurality of robots while avoiding interference with each other.

In the above-mentioned aspect, it is preferable that the robot control unit is configured to receive the position coordinates on the reference flat surface and the position coordinates of the reference reflection portions from a position measuring apparatus which uses a laser beam, and is configured to set the coordinate system using the received position coordinates.

In such a configuration, the position measuring apparatus which uses a laser beam is used so that setting of the coordinate system can be easily performed with a short time.

In the above-mentioned aspect, it is preferable that the reference flat surface be a flat surface which has a guaranteed flatness.

The flatness of the reference flat surface is guaranteed in this manner. That is, the reference flat surface has a known flatness of a predetermined value or less. Accordingly, it is possible to set the coordinate system of the robot with more certainty.

According to a second aspect of the present invention, there is provided a robot system including: a robot installed on a reference flat surface; and a robot control unit configured to control an operation of the robot, wherein the robot control unit is configured to set a coordinate system of the robot, installed on the reference flat surface, using measurement results of at least position coordinates in a vertical direction of three or more measurement points on the reference flat surface and measurement results of position coordinates of a plurality of reference reflection portions provided on the base portion of the robot, and the robot system further comprises an operation program re-setting means configured to perform re-setting of a parameter of an operation program based on displacement of the set coordinate system, the displacement is displacement of the set coordinate system with respect to an initial coordinate system set in advance in the robot or the robot control unit, or displacement of a z axis of the set coordinate system with respect to a vertical axis, the operation program is for operating the robot.

Also in the second aspect, the robot is installed on the reference flat surface, and setting of the coordinate system of the robot installed on the reference flat surface is performed using the measurement results of at least the position coordinates in the vertical direction of the three or more measurement points on the reference flat surface, and the measurement results of the position coordinates of the plurality of reference reflection portions provided on the base portion of the robot. Accordingly, compared to a case where the initial coordinate system, which is set in advance in the robot or the robot control unit at the time of manufacturing the robot, is used as it is, it is possible to more accurately control the operation of the installed robot.

Further, re-setting of parameters of the operation program for operating the robot is performed based on displacement of the coordinate system, which is set, with respect to the initial coordinate system set in advance in the robot or the robot control unit, or based on displacement of the z axis of the coordinate system, which is set, with respect to the vertical axis. Such a configuration is advantageous for more accurately controlling the operation of the robot by the operation program.

According to a third aspect of the present invention, there is provided a method for setting a coordinate system of a robot, the method including: a step of installing a robot on a reference flat surface; a flat-surface-position measuring step of measuring at least position coordinates in a vertical direction of three or more measurement points on the reference flat surface; a reflection-portion-position measuring step of measuring position coordinates of a plurality of reference reflection portions provided on a base portion of the robot; and a coordinate system setting step of setting a coordinate system of the robot, installed on the reference flat surface, using the position coordinates of the measurement points on the reference flat surface and the position coordinates of the reference reflection portions.

In the coordinate system setting step in the third aspect, it is preferable that a robot control unit receives the position coordinates on the reference flat surface and the position coordinates of the reference reflection portions from a position measuring apparatus which uses a laser beam, and the robot control unit sets the coordinate system using the received position coordinates.

In the third aspect, it is preferable that the method further include an operation program re-setting step of performing re-setting of a parameter of an operation program based on displacement of the set coordinate system, the displacement is displacement of the set coordinate system with respect to an initial coordinate system set in advance in the robot or the robot control unit, or displacement of a x axis of the set coordinate system with respect to a vertical axis, the operation program is for operating the robot.

According to the aforementioned aspects, it is possible to more accurately control the operation of the installed robot.

The invention claimed is:

1. A robot installed on a reference flat surface, the robot comprising a robot control unit configured to control an operation of the robot,
    wherein the robot control unit is configured to set a coordinate system of the robot, installed on the reference flat surface, using measurement results of at least position coordinates in a vertical direction of three or more measurement points on the reference flat surface and measurement results of position coordinates of two reference reflectors provided on a base of the robot, and
    wherein the robot control unit is configured to receive the position coordinates on the reference flat surface and the position coordinates of the two reference reflectors from a position measuring apparatus, which uses a laser beam, and is configured to set the coordinate system using the received position coordinates.

2. The robot according to claim 1, wherein the reference flat surface is a flat surface which has a guaranteed flatness.

3. A robot system comprising:
a robot installed on a reference flat surface; and
a robot control unit configured to control an operation of the robot, wherein
the robot control unit is configured to set a coordinate system of the robot, installed on the reference flat surface, using measurement results of at least position coordinates in a vertical direction of three or more measurement points on the reference flat surface and measurement results of position coordinates of two reference reflectors provided on a base of the robot,
the robot control unit or another control unit is configured to conduct an operation program re-setting process to perform re-setting of a parameter of an operation program based on displacement of the set coordinate system,
the displacement is displacement of the set coordinate system with respect to an initial coordinate system set in advance in the robot or the robot control unit, or displacement of a z axis of the set coordinate system with respect to a vertical axis,
the operation program is for operating the robot, and
the robot control unit is configured to receive the position coordinates on the reference flat surface and the position coordinates of the two reference reflectors from a position measuring apparatus, which uses a laser beam, and is configured to set the coordinate system using the received position coordinates.

4. A method for setting a coordinate system of a robot, the method comprising:
a step of installing a robot on a reference flat surface;
a flat-surface-position measuring step of measuring at least position coordinates in a vertical direction of three or more measurement points on the reference flat surface;
a reflector-position measuring step of measuring position coordinates of two reference reflectors provided on a base of the robot; and
a coordinate system setting step of setting a coordinate system of the robot, installed on the reference flat surface, using the position coordinates of the measurement points on the reference flat surface and the position coordinates of the two reference reflectors,
wherein, in the coordinate system setting step, a robot control unit receives the position coordinates on the reference flat surface and the position coordinates of the two reflectors from a position measuring apparatus, which uses a laser beam, and the robot control unit sets the coordinate system using the received position coordinates.

5. The method for setting a coordinate system of a robot according to claim 4 further comprising an operation program re-setting step of performing re-setting of a parameter of an operation program based on displacement of the set coordinate system, the displacement is displacement of the set coordinate system with respect to an initial coordinate system set in advance in the robot or the robot control unit, or displacement of a z axis of the set coordinate system with respect to a vertical axis, the operation program is for operating the robot.

* * * * *